Patented May 15, 1928.

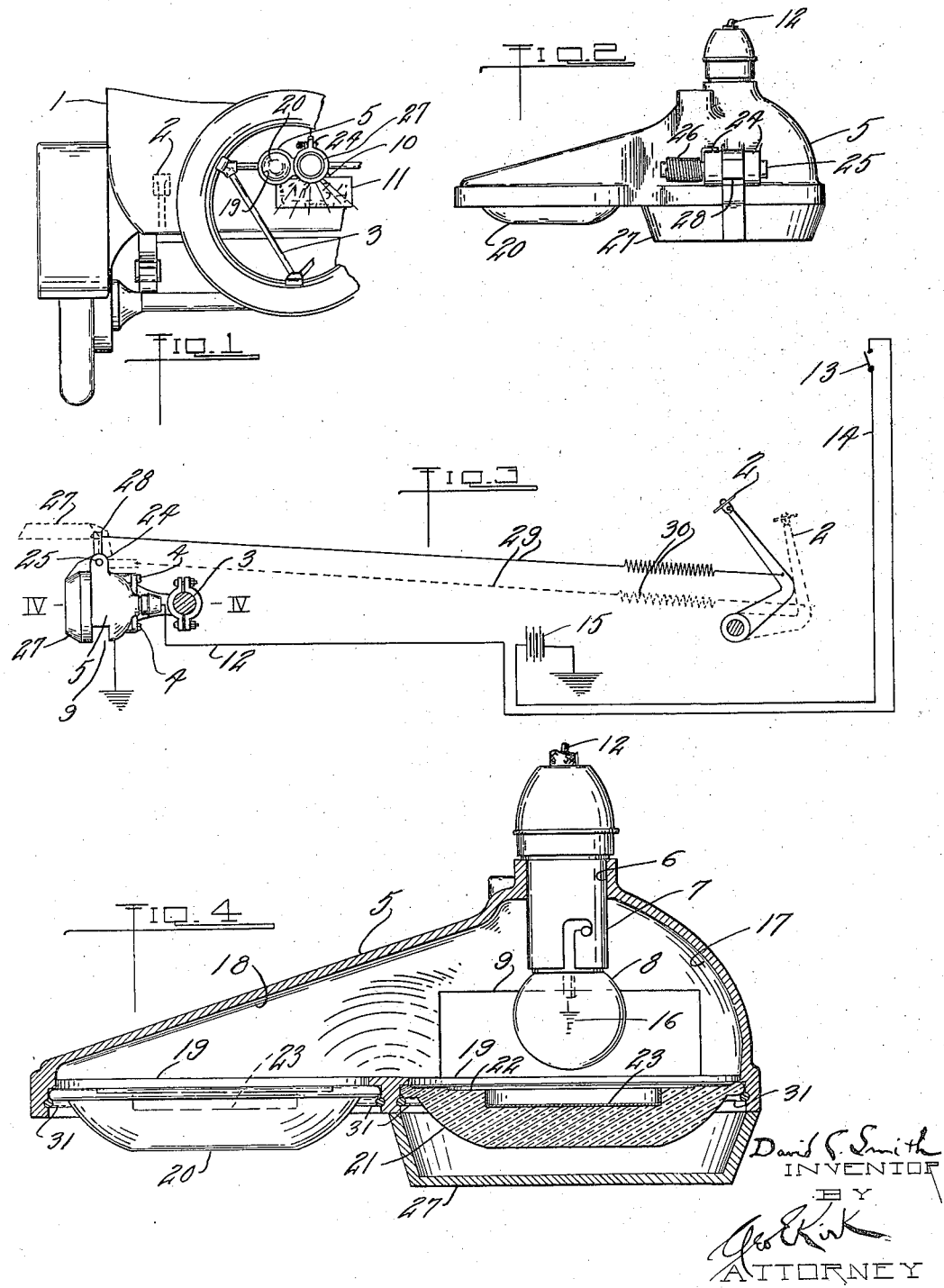

1,670,011

UNITED STATES PATENT OFFICE.

DAVID C. SMITH, OF TOLEDO, OHIO, ASSIGNOR TO AUGUST KADOW, OF TOLEDO, OHIO.

TRAFFIC SIGNAL.

Application filed October 31, 1924. Serial No. 747,015.

This invention relates to visible signals and the control therefor.

This invention has utility in connection with vehicle traffic more particularly as a tail and stop-light device combined with a license carrier.

Referring to the drawings:

Fig. 1 is a fragmentary view of an embodiment of the invention as a tail and stop-light for a motor vehicle with the license carrier therewith;

Fig. 2 is a plan view on an enlarged scale of the device of Fig. 1;

Fig. 3 is a side elevation of the device of Fig. 1 showing its control connections; and Fig. 4 is a partial section on the line IV—IV, Fig. 3.

Motor vehicle 1 is shown as provided with pedal 2 for clutch or brake operation. Tire carrier 3 is shown as having bolts 4 therefrom mounting housing 5. This housing 5 is provided with rear opening 6 for socket 7 carrying bulb 8. Below this bulb 8 is window 9. License carrier bracket 10 is shown as mounting license plate 11 in position below this window 9 for illumination by the bulb 8. Line 12 from the socket 7 extends to switch 13 which may be closed to connect line 14 and battery 15 in circuit with the bulb 8 so that as the housing 5 is grounded with the car and one side of the battery 15 is grounded with the car, circuit may be completed for lighting filament 16 in the bulb 8.

This housing 5 has about the bulb 8 reflector wall 17 and away therefrom reflector wall 18. Similar circular openings 19 are disposed rearwardly of these walls 17, 18, and carry respectively lenses 20, 21, shown as provided with shoulders 22 providing depression having mirror 23 as a region thereof whereby light rays from the rear as entering the respective lenses 21 or 20 and striking the reflector region 23 are thrown back while rays outside this region 23 may pass through the lens. From this it follows, that upon illumination of the bulb 8 by its filament 16, the rays from this bulb 8 may directly pass through the lens 21 in the region outside the mirror reflector portion 23, while the rays from this bulb 8 may indirectly pass through the lens 20 in the region bounding its reflector 23.

The action of the central reflector portion 23 of the lens 20 is such even in the daytime and with the bulb 8 not illuminated, that the driver of an approaching vehicle may see the lens 20. With such lens say of a color, as red for a tail light lens, this red reflection is observed by approaching traffic and makes this lens effective whether or not the bulb 8 be lighted and whether day or night. Of course, at night the illumination is by reflected light from the headlights of an approaching vehicle.

The lens 21 as herein shown is a stop-light or stop signal. Lugs 24 on the upper side of the housing 5 carry hinge pin 25 about which is wrapped helical spring 26. This helical spring 26 is fixed with closure or lid 27 normally thrust by the spring 26 into seating position for obscuring the lens 21. Rigid with this lid or closure 27 is upstanding arm 28 from which extends flexible connection 29 having yieldable connection through tension spring 30 with the pedal 2. Accordingly, upon throwing forward such pedal 2, whether for brake or clutch, the draft on the connection 29 swings the lid 27 to the dotted line position shown in Fig. 3 thereby exposing the lens 21 to the view of the one approaching the vehicle 1 from the rear.

In day-time or when the light 8 is not illuminated, this displays an additional reflection as a display signal from the reflector region 23 of the lens 21, notwithstanding the lens 20 may maintain its regular reflector region. At night this swinging of the closure 27 to expose the lens 21 allows the direct rays from the bulb 8 to pass through the lens 21 in the region surrounding this reflector 23 to give the stop-light lens signal to an approaching driver or anyone in the rear of the vehicle 1. The lenses 20, 21, are assembled in the housing 5 in a convenient manner as by split retaining ring 31. This housing device is one whereby a single bulb 8 may have its filament 16 effective in three ways. It is effective as a license illuminating device; it is effective as a tail-light through the lens 20; it is effective as a stop signal through the lens 21.

The lens 21 is normally obscured. In the event the filament 16 burns out, the mirrors or reflectors 23 of the lenses 20, 21, are factors in displaying through the action of an approaching headlight the visible signal to the driver of such vehicle.

What is claimed and it is desired to secure by Letters Patent is:

1. A signal device embodying a housing, a lens mounted thereon, said lens having a reflecting mirror region for turning back rays thereto and a translucent region for transmitting rays therethrough, a light in said housing, and a hinged lid exterior of said housing and lens movable to expose said lens, whereby control is had of the lens as a visible signal whether or not from transmitted or reflected light.

2. A traffic signal housing, a light bulb therein, a window in said housing, a license mounting connected to the housing for disclosing a license as illuminated by the bulb rays through said window, a tail-light lens in said housing, an additional stop lens in said housing and laterally of said tail-light lens, and control means exterior of the housing movable for exposing said stop lens independently of disturbing illumination of the license through the window and the tail-light lens illumination.

In witness whereof I affix my signature.

DAVID C. SMITH.